US 6,542,251 B2

United States Patent
Mueller-Rentz

(10) Patent No.: US 6,542,251 B2
(45) Date of Patent: Apr. 1, 2003

(54) ILLUMINATION AND IMAGING DEVICE FOR MULTIPLE SPECTRAL REGIONS, AND COORDINATE MEASURING MACHINE HAVING AN ILLUMINATION AND IMAGING DEVICE FOR MULTIPLE SPECTRAL REGIONS

(75) Inventor: Arnold Mueller-Rentz, Brechen (DE)

(73) Assignee: Leica Microsystems Wetzlar GmbH, Wetzler (DE)

( * ) Notice: Subject to any disclaimer, the term of this patent is extended or adjusted under 35 U.S.C. 154(b) by 0 days.

(21) Appl. No.: 09/934,686

(22) Filed: Aug. 23, 2001

(65) Prior Publication Data

US 2002/0027663 A1 Mar. 7, 2002

(30) Foreign Application Priority Data

Aug. 28, 2000 (DE) .......................................... 100 42 140

(51) Int. Cl.⁷ .............................................. G01B 11/14
(52) U.S. Cl. ........................ 356/614; 356/615; 356/399
(58) Field of Search .................................. 356/614, 615, 356/399, 400, 401, 451, 237.1, 237.2, 237.3, 394; 355/67, 53, 50, 55

(56) References Cited

U.S. PATENT DOCUMENTS 4,298,283 A * 11/1981 Makosch et al. ........... 356/495
4,708,481 A * 11/1987 Mori et al. .................. 356/493
5,528,368 A * 6/1996 Lewis et al. ........... 250/339.02

FOREIGN PATENT DOCUMENTS

DE          198 19 492 A1    11/1999

* cited by examiner

Primary Examiner—Frank G. Font
Assistant Examiner—Roy M. Punnoose
(74) Attorney, Agent, or Firm—Crowell & Moring LLP

(57) ABSTRACT

An illumination and imaging device (2) for multiple spectral regions comprises an objective (21) that defines an optical axis (20). A beam splitter module (32) is arranged in the optical axis (20). Multiple light sources (35), from each of which an illuminating beam path (35a, 35b, 35c) proceeds, are associated with the beam splitter module (32). Also provided are multiple detectors (34), associated with each of which is an imaging beam path (34a, 34b). The illuminating beam paths (35a, 35b, 35c) and imaging beam paths (34a, 34b) have a common optical path segment in which the beam splitter module (32) is arranged. The illumination and imaging device (2) can advantageously be used in a coordinate measuring machine (1).

16 Claims, 5 Drawing Sheets

ILLUMINATION AND IMAGING DEVICE FOR MULTIPLE SPECTRAL REGIONS, AND COORDINATE MEASURING MACHINE HAVING AN ILLUMINATION AND IMAGING DEVICE FOR MULTIPLE SPECTRAL REGIONS

CROSS REFERENCE TO RELATED APPLICATIONS

This invention claims priority of the German patent application 100 42 140.7 which is incorporated by reference herein.

FIELD OF THE INVENTION

The invention concerns an illumination and imaging device for multiple spectral regions. The invention furthermore concerns a coordinate measuring machine having an illumination and imaging device for multiple spectral regions.

BACKGROUND OF THE INVENTION

In the production of semiconductor chips, as the packing density becomes greater and greater, the pattern widths of the individual patterns become increasingly small. Corresponding to the smaller and smaller patterns, demands in terms of the specifications of coordinate measuring machines, which are used as measurement and inspection systems for measuring the edges of patterns and the position of patterns and for measuring pattern widths, are also increasing. Optical sensing methods continue to be favored in the context of these coordinate measuring instruments, although pattern widths are already smaller than the light wavelength used for measurement or inspection. The reason is that measurement systems with optical sensing methods are substantially easier to use than systems which sense differently, for example using electron beams.

Because the patterns being measured are becoming ever smaller, however, requirements are increasing in terms of not only the properties of the optical system used but also the properties of an illumination and imaging device used for evaluation and analysis.

A coordinate measuring machine is disclosed in German Unexamined Application DE-A-198 19 492. Illumination of the specimen in incident light is accomplished by way of a light source in the near UV spectral region. Also provided, for detection, is a detector device whose imaging beam path is coupled via a beam splitter into the optical axis defined by an objective. This system does not permit simultaneous illumination and analysis of the specimen under examination using multiple spectral regions, or evaluation on the basis of separate spectral regions.

SUMMARY OF THE INVENTION

It is the object of the invention to create an illumination and imaging unit that is suitable for multiple spectral regions.

The stated object is achieved by an illumination and imaging unit having an objective that defines an optical axis;

a beam splitter module that is arranged in the optical axis;

a plurality of light sources, from each of which an illuminating beam path proceeds; and a plurality of detectors, associated with each of which is an imaging beam path, the illuminating beam paths and imaging beam paths having a common optical path segment in which the beam splitter module is arranged.

A further object of the invention is to create a coordinate measuring machine that is suitable for measuring very fine patterns on a specimen, and in that context for irradiating the specimen under examination with multiple spectral regions.

The stated object is achieved by a coordinate measuring machine comprising:

an illumination and imaging device for multiple spectral regions, that defines an optical axis; and a displaceable measurement stage, interferometrically measurable perpendicular and relative to the optical axis, for reception of a specimen.

One advantage of the invention is that the illumination and imaging device is equipped with a beam splitter module that is arranged in the optical axis of the objective used for imaging the specimen under examination. All the imaging and illuminating beam paths are guided along the optical axis. In addition, multiple light sources, from each of which an illuminating beam path proceeds, are provided. The light sources can be configured in such a way that they emit light in a very specific wavelength region. As already mentioned, multiple detectors, with each of which an imaging beam path is associated, are also provided, the illuminating beam paths and imaging beam paths having a common optical path segment in which the beam splitter module is arranged. As a result, the different detectors can each selectively be impinged upon with different wavelength regions.

It is also particularly advantageous to utilize the illumination and imaging device in a coordinate measuring machine. The coordinate measuring machine must be designed so that all possible interfering influences which interfere with a highly accurate measurement are for the most part excluded. Only then is it possible to measure the position of edges on patterns with an accuracy of a few nanometers. With the illumination and imaging device according to the present invention, despite the presence of multiple light sources and detectors it is not necessary to make switchovers or to initiate a mechanical displacement of the optical path segment. These operations would generate turbulence or heat, influencing the measurement in undefined fashion. The use of the beam splitter module in the illumination and imaging device makes it possible for all the illuminating and imaging beam paths to pass through only one objective. The illumination and imaging device is suitable for multiple spectral regions.

One embodiment of the illumination and imaging device proves to be particularly advantageous for very accurate measurement using the coordinate measuring machine. Here there is arranged after the objective a respective beam splitter module having four beam splitters, each arranged in paired fashion in a beam splitter group. In each group, the first beam splitter is a fifty/fifty splitter and the second beam splitter is a dichroic splitter. The properties of the beam splitters in terms of wavelength are such that the first beam splitter group allows own light of a wavelength above a first wavelength $\lambda_1$ to pass, and the second beam splitter group allows only light of a wavelength below a second wavelength $\lambda_2$ to pass. In addition, behind the second group a detector is arranged after the beam splitter module in the transmitted beam path; the detector detects in the wavelength region between $\lambda_1$ and $\lambda_2$. The aforesaid three different spectral regions are thereby available. In order to achieve a corresponding high-quality image, the objective is corrected in diffraction-limited fashion in the region between a lower wavelength $\lambda_{min}$ that is smaller than $\lambda_1$ and an upper wavelength $\lambda_{max}$ that is greater than $\lambda_2$. In the preferred exemplary embodiment, the wavelengths are $\lambda_{min}$=365 nm and $\lambda_{max}$=900 nm.

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
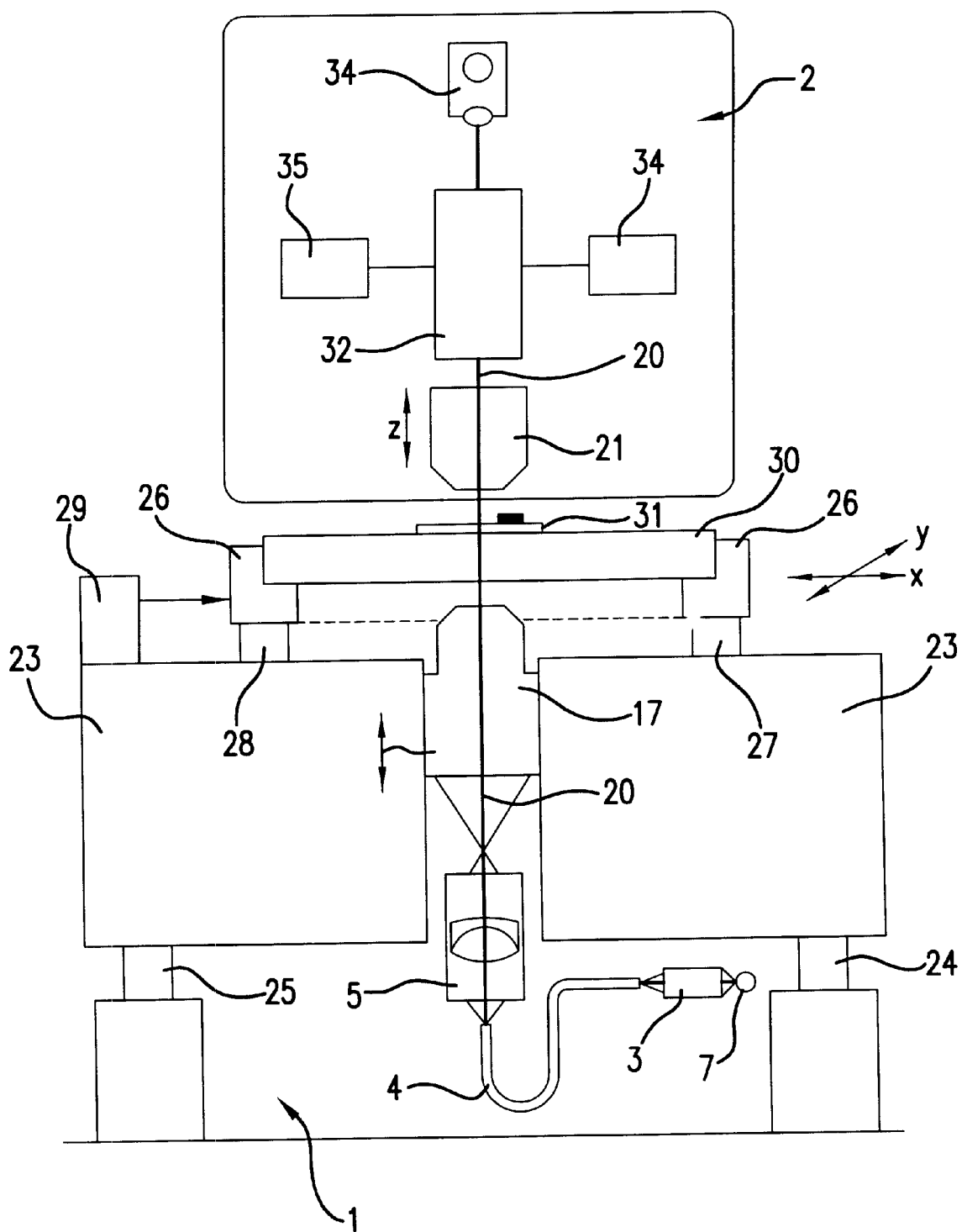
FIG. 1 schematically depicts a coordinate measuring machine having the illumination and imaging device according to the present invention.

FIG. 1 shows an exemplary embodiment of a coordinate measuring machine 1 having a combined incident-light and transmitted-light illumination system which comprises an illumination and imaging device 2 according to the present invention.

The coordinate measuring machine depicted comprises a granite block 23 that is mounted on vibration dampers 24, 25. On granite block 23, a measurement stage 26 configured as a frame is slidingly displaceable on air bearings 27, 28 in the X and Y directions (indicated in the drawing by two arrows). The frame of measurement stage 26 is advantageously made of a glass ceramic with a low coefficient of thermal expansion. The drive elements for moving measurement stage 26 are not depicted. The position of measurement stage 26 is measured in the X and Y directions with a laser interferometer system 29.

A specimen 30 is placed into measurement stage 26. Specimen 30 is made, for example, of quartz glass. Patterns 31 are applied on the specimen surface. Since measurement stage 26 is configured as a frame, specimen 30 can also be transilluminated from below.

Located above specimen 30 is illumination and imaging device 2, which possesses a high optical quality. Illumination and imaging device 2 is arranged around an optical axis 20. Focusing is possible along optical axis 20 in the Z direction. Illumination and imaging device 2 comprises a beam splitter module 32 and in multiple detectors 34, and also multiple illumination devices 35. By means of detectors 34, the position of a pattern 31 is determined as coordinates on specimen 30.

Also set into granite block 23 is a transmitted-light illumination device having an adjustable-height condenser 17 and a light source 7. A transmitted-light illuminating beam path with an optical axis 20 proceeds from light source 7. The light of light source 7 is picked off via an enlarging coupling-in optical system 3 with the largest possible numerical entrance aperture (e.g. NA=0.60). In this fashion, a particularly large amount of light is acquired from light source 7. The acquired light is coupled by way of coupling-in optical system 3 into an optical waveguide. An optical fiber bundle 4 is used as the optical waveguide.

A coupling-out optical system 5, which preferably is configured as an achromat, collimates the light emitted from fiber bundle 4.

The optical axis of condenser 17 aligns with optical axis 20. The height adjustment of condenser 17 serves to adapt the illuminating beams, which are to be directed onto pattern 31, to different optical thicknesses of masks 30. The condenser head can, in particular, extend into the open portion of the measurement stage frame. To protect against damage during displacements of measurement stage 26 over the entire mask surface, however, condenser 17 can also be pulled below the surface of granite block 23. Light source 7 and the multiple illumination devices 35 of illumination and imaging device 2 can be switched on independently of one another.

Figure 2:
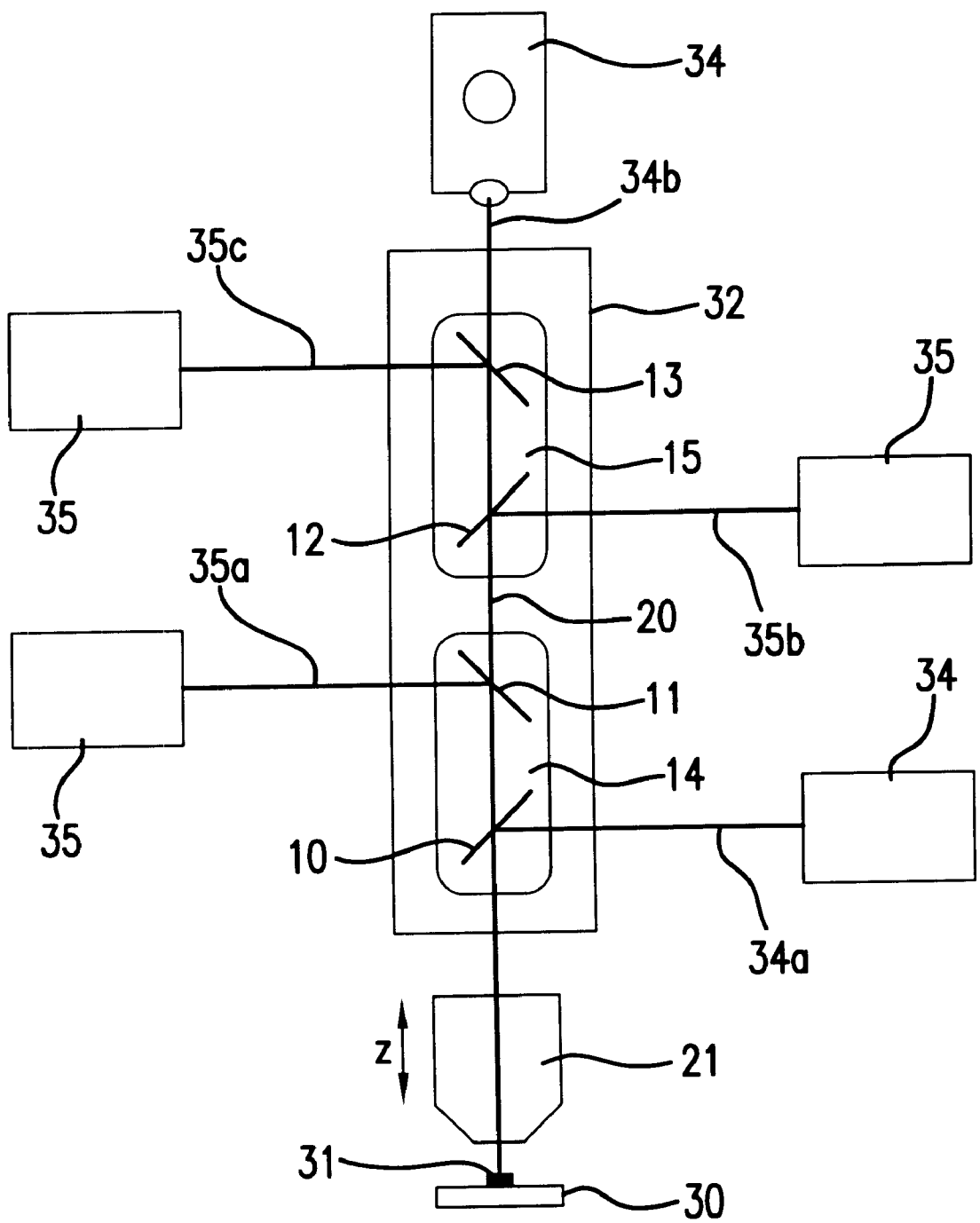
FIG. 2 schematically depicts the illumination and imaging device.

FIG. 2 shows a particular embodiment of illumination and imaging device 2 that is suitable for multiple spectral regions and makes possible, for multiple spectral regions, an image of high optical quality. Illumination and imaging device 2 comprises an objective 21 that is arranged in optical axis 20 and defines optical axis 20. Downstream from objective 21 is a beam splitter module 32 that is arranged substantially centeredly about optical axis 20. Illumination and imaging device 2 furthermore comprises multiple detectors 34 and multiple light sources 35. Beam splitter module 32 comprises multiple beam splitters 10, 11, 12, and 13 that are arranged around and along optical axis 20. In a particular embodiment, proceeding from objective 21, first and second beam splitters 10 and 11 are arranged in a first group 14, and third and fourth beam splitters 12 and 13 are arranged in a second group 15. The first beam splitter 10 and 12 of each group 14 and 15 is configured as a fifty/fifty splitter. The second beam splitter 11 and 13 of each group 14 and 15 is configured as a dichroic splitter. First beam splitter 10 of first group 14 is associated with a detector 34 that is arranged in a pertinent imaging beam path 34a. This beam splitter 10 serves to couple light out of the common optical path segment in beam splitter module 32. The common optical path segment in beam splitter module 32 is identical to optical axis 20. Second beam splitter 11 of first group 14 is associated with a light source 35 that is arranged in a pertinent illuminating beam path 35a. First beam splitter 12 of second group 15 is also associated with a light source 35 that is arranged in a pertinent illuminating beam path 35b. Second beam splitter 13 of second group 15 is associated with a detector 34 and a further light source 35. Detector 34 defines an imaging beam path 34b, and further light source 35 defines an illuminating beam path 35c.

In a specific embodiment for measuring patterns 31 on a specimen 30, the components described below are mounted, as light sources 34 or as detectors 35, in a specific sequence with reference to objective 21. A measurement camera is associated with first beam splitter 10 of the first group. The measurement camera is a special embodiment of detector 34. The measurement camera receives the light proceeding from specimen 30 after only one beam splitting. This is necessary in order to minimize possible aberrations due to multiple beam splitting, since the measurement of patterns 31 on specimen 30 is performed by means of the measurement camera. Any falsification of the measurement due to aberrations is thereby ruled out. Associated with second beam splitter 11 of first group 14, as light source 35, is a measurement illumination system that emits light in a wavelength region from 365 to 405 nm. Associated with first beam splitter 12 of second group 15, as light source 35, is an overview illumination system that emits light in a wavelength region from 480 to 700 nm. Associated with second beam splitter 13 of second group 15, as detector 34, is an alignment device that is responsible for alignment of the specimen with respect to illumination and imaging device 2. Also associated with this beam splitter 13 is a further light source 34 that is configured as a laser autofocus system. The laser autofocus system operates with wavelengths above 800 nm.

The beam splitters are arranged correspondingly as a function of the wavelength used for measurement of specimen 30. Proceeding from objective 21, first group 14 of beam splitters 10 and 11 is configured in such a way that only light of a wavelength above a first wavelength $\lambda_1$ is allowed to pass. Second group 15, comprising beam splitters 12 and 13, is configured in such a way that only light of a wavelength below a second wavelength $\lambda_2$ is allowed to pass. As already mentioned above, a detector 34 is located behind second group 15 in imaging beam path 34b of beam splitter module 32, detector 34 detecting in the wavelength region between $\lambda_1$ and $\lambda_2$. The objective is corrected in diffraction-limited fashion between a lower wavelength $\lambda_{min}$ that is smaller than $\lambda_1$ and an upper wavelength $\lambda_{max}$ that is greater than $\lambda_2$.

Figure 3:
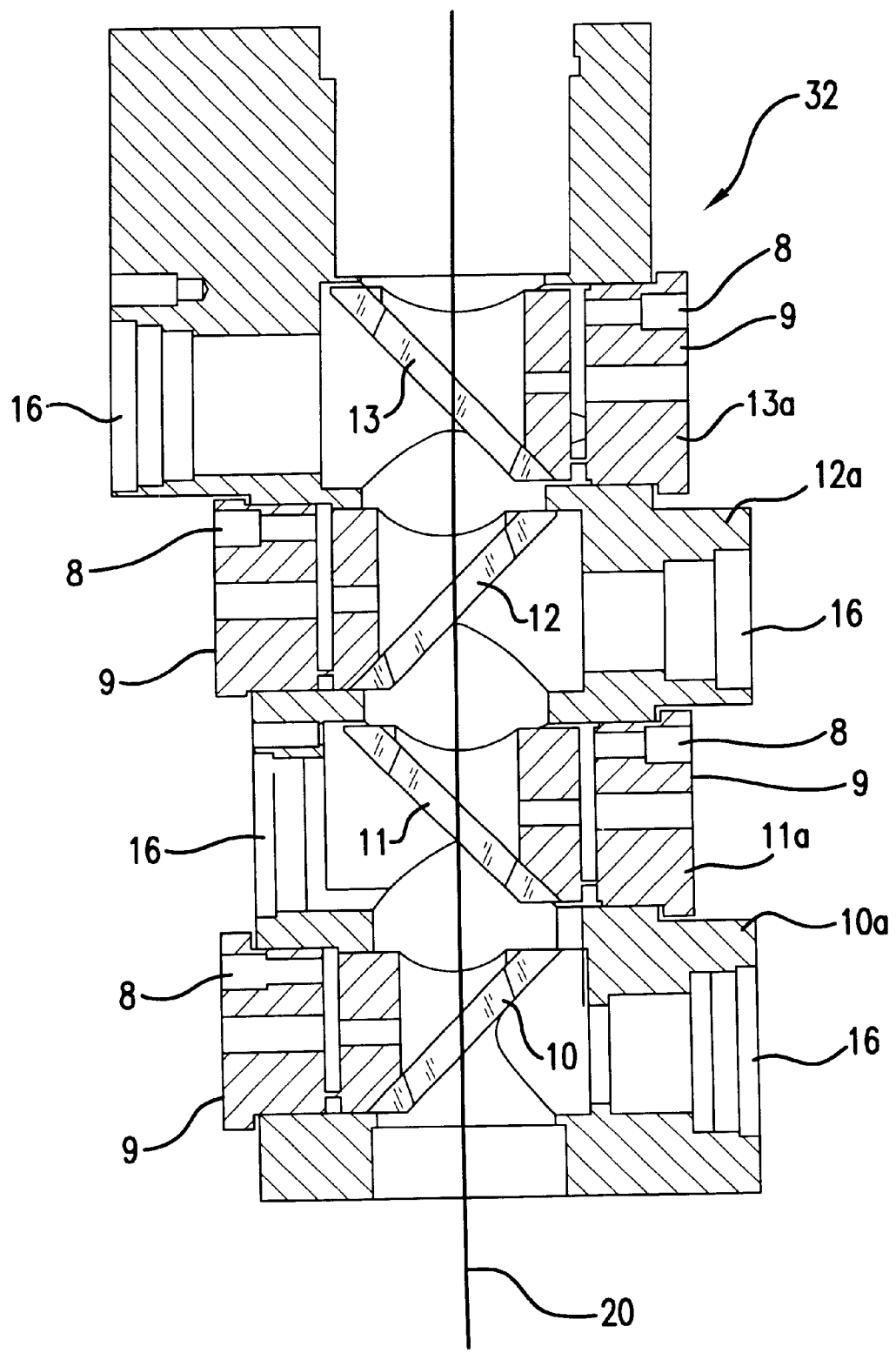
FIG. 3 shows a physical configuration of the multiple beam splitter module that is part of the illumination and imaging device of the invention.

FIG. 3 depicts an embodiment of a physical configuration of a beam splitter module 32. Beam splitter module 32 defines a lower part adjacent to which is objective 21 (see FIG. 2). Beam splitter module 32 furthermore defines an upper part in which is configured a bore that is configured to receive an optical system (not depicted). Associated with the optical system is a detector 34 that, in this embodiment, is an alignment device. Each of beam splitters 10, 11, 12, and 13 is set immovably into a mount. The beam splitter having reference character 10 is set in a first mount 10a, the beam splitter having reference character 11 is set in a second mount 11a, the beam splitter having reference character 12 is set in a third mount 12a, and the beam splitter having reference character 13 is set in a fourth mount 13a. Each of mounts 10a, 11a, 12a, and 13a has a flange 16 on which can be mounted optical elements that guide light to or from mounts 10a, 11a, 12a, and 13a to detectors 34 or light sources 35. Provided opposite flange 16 in each mount 10a, 11a, 12a, and 13a is an adjusting element 9 in which is arranged a bore 8 for an adjusting screw (not depicted) which allows adjustment of the beam splitter with respect to optical axis 20. It is to be noted that the beam splitters having reference characters 10 and 12 are each inclined 45° with respect to the optical axis. In addition, the beam splitters having reference characters 11 and 13 are each inclined −45° with respect to the optical axis. A corresponding mirror-reversed arrangement is possible, and is self-evident to anyone skilled in the art.

Figure 4:
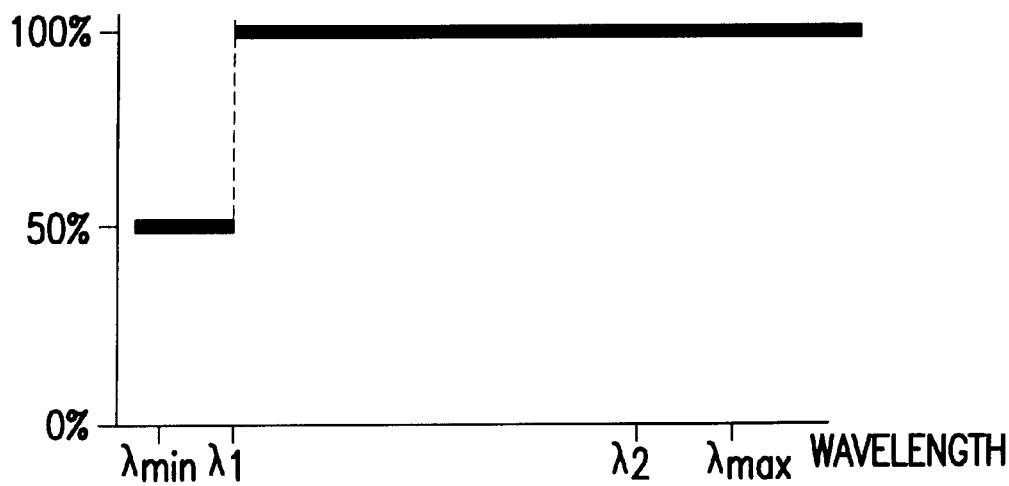
FIG. 4 shows a diagram of the optical properties of the first beam splitter of the first group of the beam splitter module.
Figure 5:
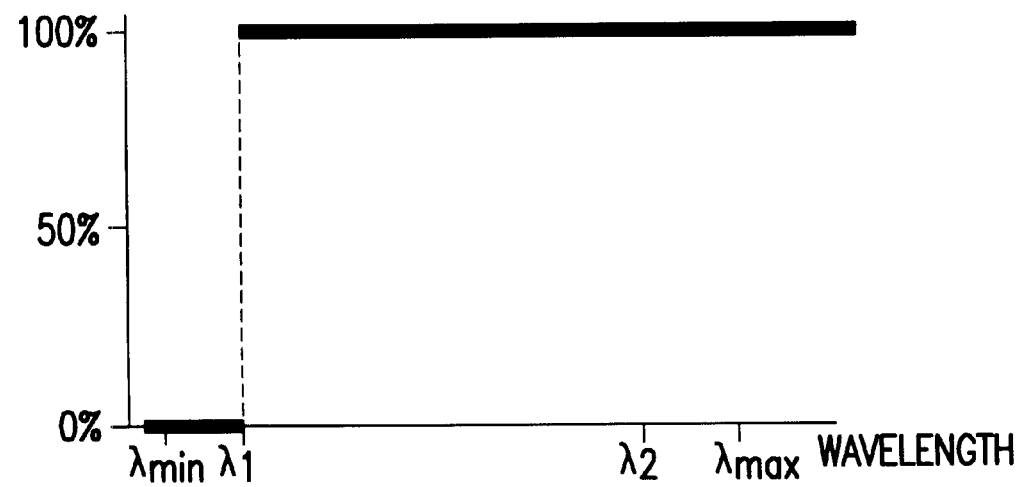
FIG. 5 shows a diagram of the optical properties of the second beam splitter of the first group of the beam splitter module.
Figure 6:
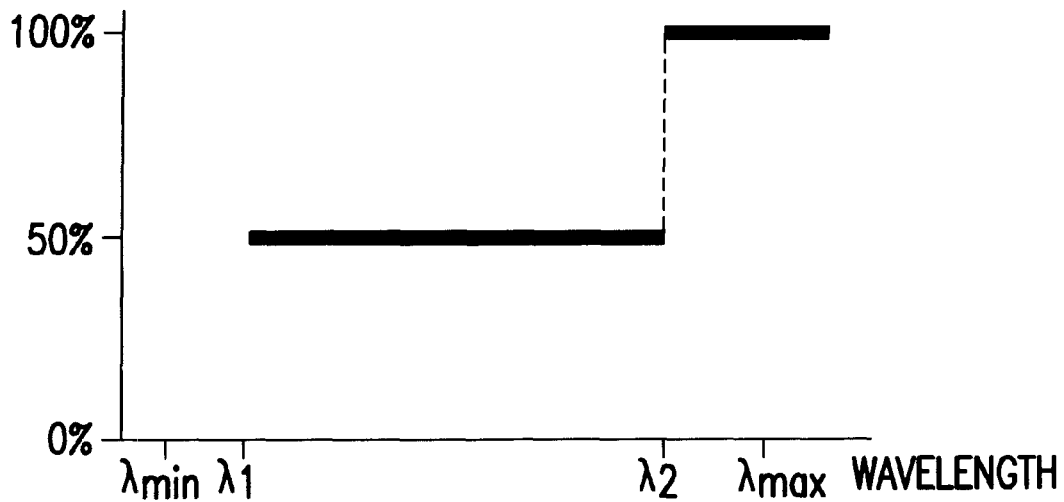
FIG. 6 shows a diagram of the optical properties of the first beam splitter of the second group of the beam splitter module.
Figure 7:
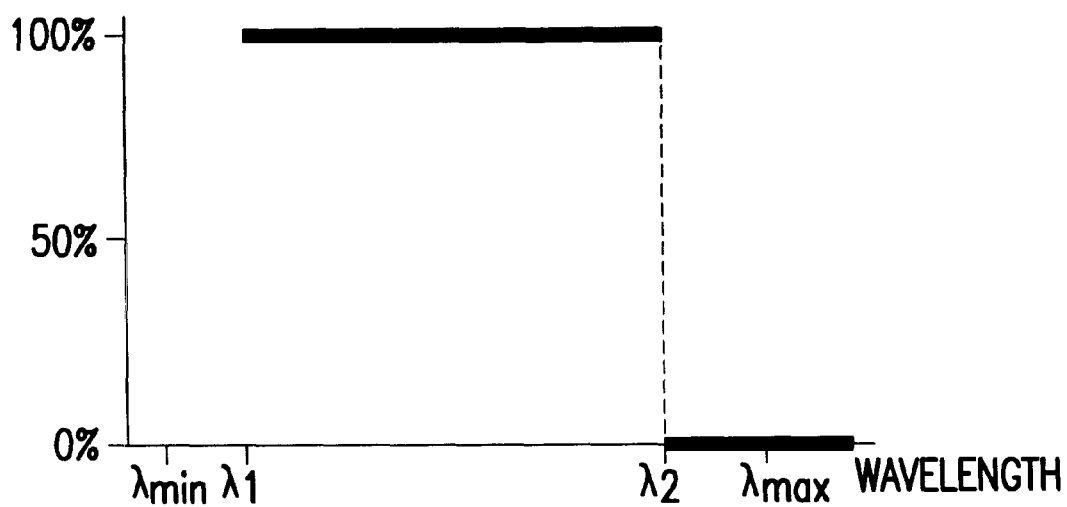
FIG. 7 shows a diagram of the optical properties of the second beam splitter of the second group of the beam splitter module.

The optical properties of beam splitters 10, 11, 12, and 13 are depicted in FIGS. 4 through 7. The sequence in which the beam splitters are arranged in beam splitter module 32 proceeding from objective 21, and their optical properties, are merely an exemplary embodiment and are not to be construed as a limitation of the invention. Beam splitter 10 that immediately follows objective 21 is configured as a fifty/fifty beam splitter. This beam splitter reflects 50% of the light toward flange 16, and the other 50% is allowed to pass along optical axis 20. The properties of beam splitter 10 in terms of wavelengths are depicted in FIG. 4. In the region from $\lambda_{min}$=350 run to approximately $\lambda_1$=420 mn, this beam splitter 10 functions as a fifty/fifty beam splitter. For wavelengths that are greater than $\lambda_1$=420 nm, all of the light is allowed to pass along optical axis 20. Along the optical axis, the light allowed to pass by beam splitter 10 strikes beam splitter 11. This beam splitter 11 is a cutoff splitter. As depicted in FIG. 5, all the light in the region from $\lambda_{min}$=350 nm to approximately $\lambda_1$=420 nm is reflected toward flange 16 of mount 11a. Only light with a wavelength greater than $\lambda_1$=420 nm is allowed to pass along optical axis 20. The light coming from beam splitter 11 next strikes beam splitter 12, which is installed in mount 12a. This beam splitter 12 is also configured as a fifty/fifty beam splitter. FIG. 6 shows the properties of beam splitter 12 in terms of wavelengths. In the wavelength region from $\lambda_1$=420 nm to approximately $\lambda_2$=750 nm, 50% of the incident light intensity is reflected toward flange 16 of mount 12a. Above the wavelength $\lambda_{max}$=900 nm, beam splitter 12 is completely transparent. The light then arrives at beam splitter 13, which is provided in mount 13a. As is evident from FIG. 7, beam splitter 13 is transparent for the wavelength region $\lambda_1$=420 nm to approximately $\lambda_2$=750 nm. Light above the wavelength $\lambda_2$=750 nm is not allowed to pass and is reflected toward flange 16 of mount 13a. The quantitative indications for the wavelengths are to be regarded merely as one possible embodiment. The selection of other wavelength regions is within the inventive ability of one skilled in the art.

The invention was described with reference to one particular embodiment. It is nevertheless self-evident that changes and modifications can be made without thereby leaving the range of protection of the claims recited hereinafter.

What is claimed is:

1. An illumination and imaging device for multiple spectral regions, comprising:
   an objective that defines an optical axis;
   a beam splitter module that is arranged in the optical axis;
   a plurality of light sources; from each of which an illuminating beam path proceeds; and
   a plurality of detectors, associated with each of which is an imaging beam path, the illuminating beam paths and imaging beams paths having a common optical path segment in which the beam splitter module is arranged, wherein the beam splitter module passes light of a different wavelength to each of the plurality of detectors.

2. The illumination and imaging device as defined in claim 1, wherein multiple beam splitters are arranged within the beam splitter module and each beam splitter is associated with one of the light sources and is arranged in its illumination beam path in order to couple it into the common optical path segment and at least one beam splitter is associated with one of the detectors and is arranged in the pertinent imaging beam path in order to couple it out of the common optical path segment.

3. The illumination and imaging device as defined in claim 1, wherein proceeding from the objective, a first and a second pair of beam splitters is arranged in a grouped fashion, the first beam splitter of each group being a fifty/fifty splitter and the second beam splitter of each group being a dichroic beam splitter.

4. The illumination and imaging device as defined in claim 3, wherein proceeding from the objective, the first beam splitter pair allows only light of a wavelength above a first wavelength $\lambda_1$ to pass; the second beam splitter pair allows only light of a wavelength below a second wavelength $\lambda_2$ to pass; and behind the second pair of beam splitters a detector is arranged after the beam splitter module in the transmitted beam path wherein the detector is detecting in the wavelength region between $\lambda_1$ and $\lambda_2$.

5. The illumination and imaging device as defined in claim 4, wherein the objective is corrected in diffraction-limited fashion in the region between a lower wavelength $\lambda_{min}$ that is smaller than $\lambda_1$ and an upper wavelength $\lambda_{max}$ that is greater than $\lambda_2$.

6. The illumination and imaging device as defined in claim 5, wherein $\lambda_{min}$=365 nm and $\lambda_{max}$=900 nm.

7. A coordinate measuring machine comprising:

an illumination and imaging device that simultaneously utilizes a plurality of different wavelengths of light to determine coordinates of a specimen and that defines an optical axis; and a displaceable measurement stage, interferometrically measurable perpendicular and relative to the optical axis, for reception of the specimen.

8. The coordinate measuring machine as defined in claim 7, wherein the illumination and imaging device comprises;

an objective that defines an optical axis;

a beam splitter module that is arranged in the optical axis;

a plurality of light sources, from each of which an illuminating beam path proceeds; and a plurality of detectors, associated with each of which is an imaging beam path, the illuminating beam paths and imaging beam paths having a common optical path segment in which the beam splitter module is arranged.

9. The coordinate measuring machine as defined in claim 8, wherein multiple beam splitters are arranged within the beam splitter module and each beam splitter is associated with one of the light sources and is arranged in its illumination beam path in order to couple it into the common optical path segment and at least one beam splitter is associated with one of the detectors and is arranged in the pertinent imaging beam path in order to couple it out of the common optical path segment.

10. The coordinate measuring machine as defined in claim 7, wherein proceeding from the objective, a first and a second pair of beam splitters is arranged in a grouped fashion, the first beam splitter of each group being a fifty/fifty splitter and the second beam splitter of each group being a dichroic beam splitter.

11. The coordinate measuring machine as defined in claim 10, wherein proceeding from the objective, the first beam splitter pair allows only light of a wavelength above a first wavelength $\lambda_1$ to pass; the second beam splitter pair allows only light of a wavelength below a second wavelength $\lambda_2$ to pass; and behind the second pair of beam splitters a detector is arranged after the beam splitter module in the transmitted beam path wherein the detector is detecting in the wavelength region between $\lambda_1$ and $\lambda_2$.

12. The coordinate measuring machine as defined in claim 7, wherein the illumination and imaging device comprises a measurement device, an alignment device, and an autofocus device.

13. The coordinate measuring machine as defined in claim 12, wherein the wavelength region below $\lambda_1$ is associated with the measurement device, the wavelength region between $\lambda_1$ and $\lambda_2$ is associated with the alignment device, and the wavelength region above $\lambda_2$ is associated with the autofocus device.

14. The coordinate measuring machine as defined in claim 13, wherein $\lambda_1$ is smaller than 420 nm, and $\lambda_2$ is greater than 800 nm.

15. The coordinate measuring machine as defined in claim 7, wherein the objective is corrected in diffraction-limited fashion in the region between a lower wavelength $\lambda_{min}$ that is smaller than $\lambda_1$ and an upper wavelength $\lambda_{max}$ that is greater than $\lambda_2$.

16. The coordinate measuring machine as defined in claim 15, wherein $\lambda_{min}$=365 nm and $\lambda_{max}$=900 nm.

* * * * *